United States Patent
Bailey et al.

[19]

[11] Patent Number: 6,123,385
[45] Date of Patent: Sep. 26, 2000

[54] TRIM PANEL MOUNTING ASSEMBLY

[75] Inventors: Charles D. Bailey, Shelby Township; Jerry DiNello, Clinton Township; David Matthew Veit, Canton, all of Mich.

[73] Assignee: Ford Motor Company, Dearborn, Mich.

[21] Appl. No.: 08/993,098

[22] Filed: Dec. 18, 1997

[51] Int. Cl.[7] ............................................. B60J 5/04
[52] U.S. Cl. .................................... 296/146.7; 52/511
[58] Field of Search ............................ 296/39.1, 146.7; 24/293–295; 52/511; 49/502

[56] References Cited

U.S. PATENT DOCUMENTS

| | | |
|---|---|---|
| 1,890,615 | 12/1932 | Kneeshaw . |
| 2,191,780 | 2/1940 | Tinnerman . |
| 2,350,255 | 5/1944 | Shippee et al. . |
| 2,618,824 | 11/1952 | Poupitch . |
| 2,653,686 | 9/1953 | Routt ........................................ 52/511 |
| 3,264,793 | 8/1966 | Schlensker ................................ 52/511 |
| 3,448,494 | 6/1969 | Boyenval et al. . |
| 4,017,945 | 4/1977 | Stanik et al. . |
| 4,529,244 | 7/1985 | Zaydel ..................................... 296/191 |
| 4,923,542 | 5/1990 | Janicki et al. . |
| 4,949,508 | 8/1990 | Elton ......................................... 49/502 |
| 5,101,540 | 4/1992 | Roof et al. ................................ 24/295 |
| 5,106,223 | 4/1992 | Kraus . |
| 5,111,619 | 5/1992 | Billin et al. . |
| 5,169,204 | 12/1992 | Kelman .................................. 296/189 |
| 5,345,721 | 9/1994 | Stein et al. .............................. 49/502 |
| 5,367,751 | 11/1994 | DeWitt ..................................... 24/295 |
| 5,529,370 | 6/1996 | Veit ...................................... 296/146.7 |

FOREIGN PATENT DOCUMENTS

| | | | |
|---|---|---|---|
| 140346 | 2/1947 | Australia ................................ 52/511 |
| 406270679 | 9/1994 | Japan ................................. 296/146.7 |

*Primary Examiner*—Dennis H. Pedder
*Attorney, Agent, or Firm*—David B. Kelley

[57] ABSTRACT

A trim panel mounting assembly for a motor vehicle includes a trim panel bracket mounted to one side of a trim panel opposite an interior of the motor vehicle and a support bracket mounted to an inner door panel opposite the trim panel bracket. The trim panel mounting assembly also includes a structure for allowing the trim panel bracket and the support bracket to self-align when the trim panel bracket and the support bracket are brought into proximate position for installation.

13 Claims, 3 Drawing Sheets

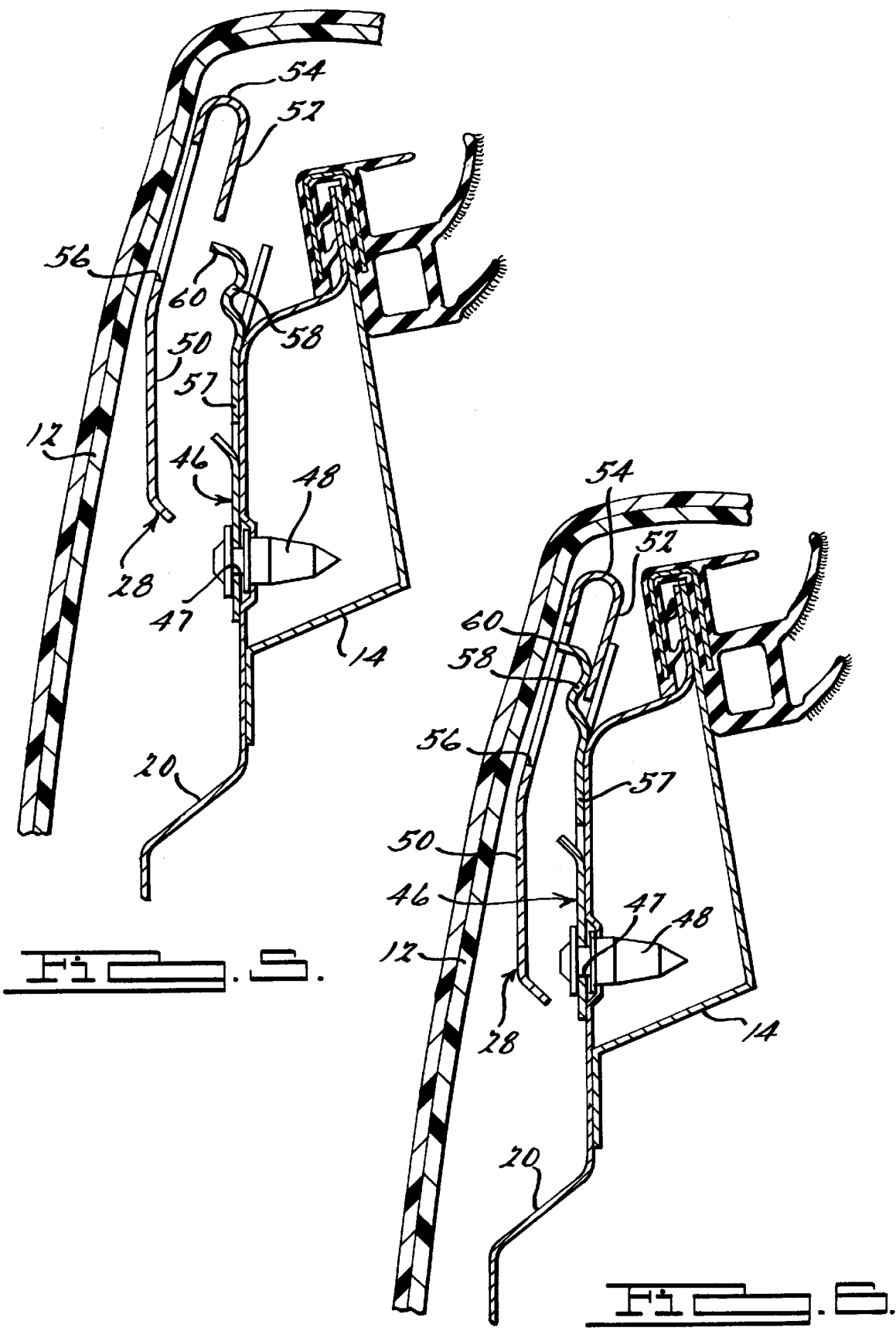

TRIM PANEL MOUNTING ASSEMBLY

BACKGROUND OF THE INVENTION

1. Field of the Invention

The present invention relates generally to trim panels for vehicles and, more specifically, to a trim panel mounting assembly for a door on a motor vehicle.

2. Description of the Related Art

Trim panels are employed as interior components on motor vehicles. One of the purposes of such interior trim panels is to present an aesthetically pleasing appearance in an occupant compartment of the motor vehicle. These trim panels are typically mounted to structural support members of the motor vehicle. For example, trim panels are mounted to an inner door panel of a door for the motor vehicle.

While they are not usually employed as structural components, there are times when these trim panels must support a load. One instance when this can occur involves loads placed on the door during opening or closing thereof via activation of an interior door handle. Interior door handles are typically mounted to the trim panels and are employed not only to pull the door shut once the occupant has entered the occupant compartment of the motor vehicle but can also sometimes be used as a support for the occupant as he/she enters the occupant compartment of the motor vehicle. This situation can occur during the egress/ingress of a truck or van where the occupant compartment is disposed relatively above a waist of the occupant. Depending on the reliance of the occupant on the support of the interior door handle, as well as the occupant's weight and manner of pulling the door shut, it is possible that substantial loads can be generated at the interior door handle on the trim panel. In fact, it is possible for the trim panel to undergo substantial deflection at the location when the loads become excessive.

It is known to provide a trim panel mounting assembly to provide a direct load path for loads applied to the interior door handle without the use of exposed fasteners. An example of such a trim panel mounting assembly is disclosed in U.S. Pat. No. 5,529,370 to Veit. The trim panel mounting assembly includes two components, referred to as a trim panel bracket and are inner panel or support bracket. These components are separately attached to the door trim panel and the inner door panel, respectively. The trim panel bracket is directly attached to the interior door handle in such a way so that the fasteners employed are not visible from the interior or occupant compartment of the motor vehicle. The inner panel bracket is directly attached to the inner door panel. The mounting assembly employs a clip feature and a leg feature on each bracket. These features are asymmetrically aligned so that the leg of one bracket fits into the clip of the other bracket when the brackets are properly installed. Once installed, the engaged brackets provide a direct load path from the interior door handle to the inner door panel. Although the above patented trim panel mounting assembly has worked well, it suffers from the disadvantage that the brackets are not visible to an installer during assembly, making it difficult to verify that engagement is achieved. As a result, the installer has to rely on "feel" and prior experience to know the correct relative positions of the brackets in order to execute the assembly process. Incorrect alignment may result in mis-assembly and repeated attempts by the installer to properly assemble the brackets. Such a scenario is undesirable in a mass production environment.

SUMMARY OF THE INVENTION

Accordingly, the present invention is a trim panel mounting assembly for a motor vehicle including a trim panel bracket mounted to one side of the trim panel opposite an interior of the motor vehicle and a support bracket mounted to vehicle structure opposite the trim panel bracket. The trim panel mounting assembly also includes means for allowing the trim panel bracket and the support bracket to self-align when the trim panel bracket and the support bracket are brought into proximate position for installation.

One advantage of the present invention is that an improved installation of a trim panel mounting assembly is provided having a direct load path in the area of the interior door handle mounted to the trim panel. Another advantage of the present invention is that a trim panel mounting assembly is provided with an alignment feature to assist the installer in locating the brackets in the correct relative position which cooperate to mount the trim panel to the inner door panel without exposing fasteners or plug buttons on the interior of the motor vehicle during assembly. Still another advantage of the present invention is that a trim panel mounting assembly for a motor vehicle is provided which simplifies the assembly procedure and prevents incorrect installation.

Other features and advantages of the present invention will be readily appreciated as the same becomes better understood after reading the subsequent description when taken in conjunction with the accompanying drawings.

BRIEF DESCRIPTION OF THE DRAWINGS

FIG. 3 is a perspective view of a trim panel bracket of the trim panel mounting assembly of FIG. 2.

FIG. 4 is a perspective view of a support bracket of the trim panel mounting assembly of FIG. 2.

FIG. 5 is a sectional view taken along line 5—5 of FIG. 1 illustrating pre-installation of the trim panel mounting assembly.

FIG. 6 is a view similar to FIG. 5 illustrating final installation of the trim panel mounting assembly.

DESCRIPTION OF THE PREFERRED EMBODIMENT(S)

Figure 1:
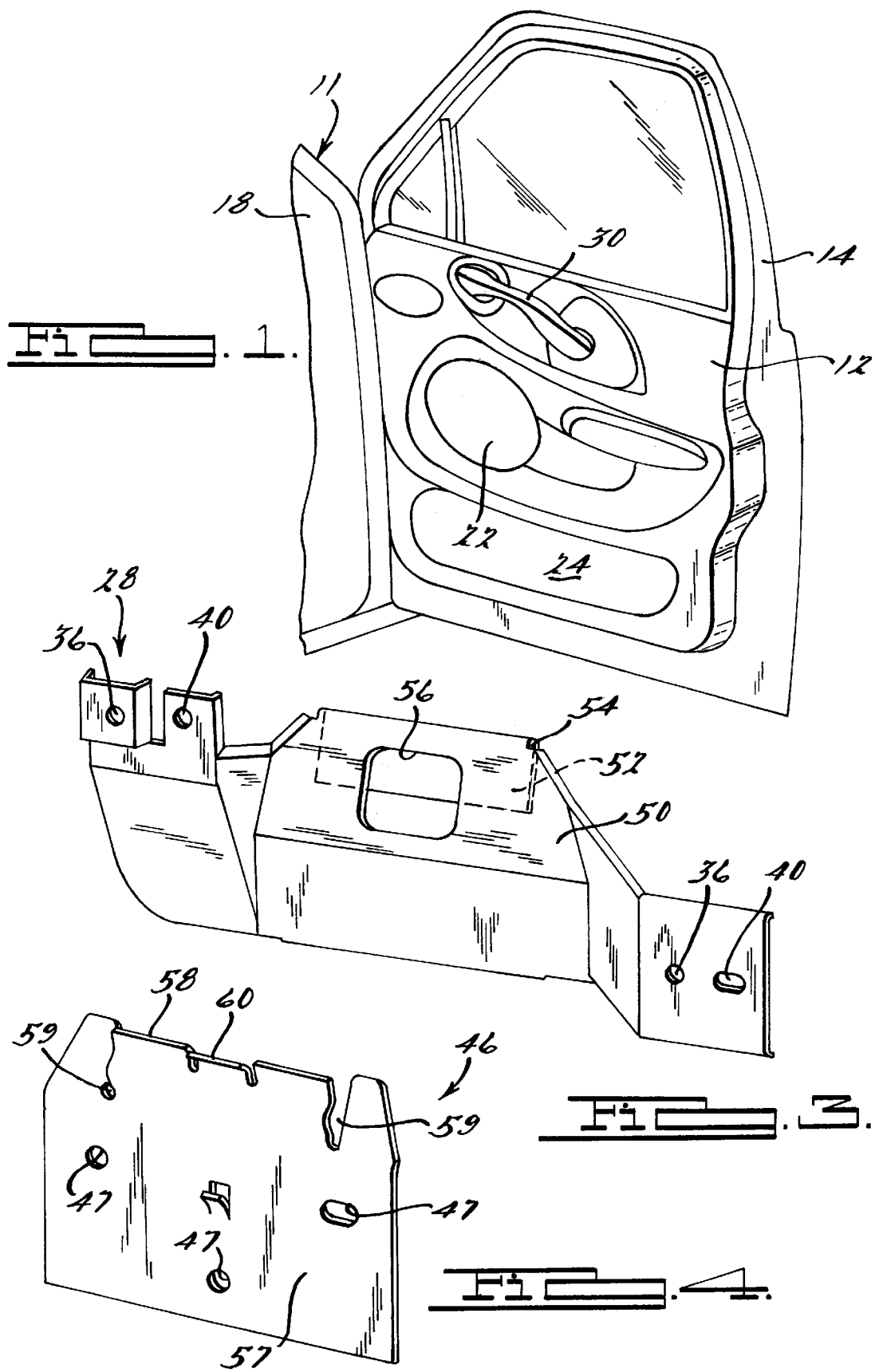
FIG. 1 is a perspective view of a trim panel mounted to a door of a motor vehicle.
Figure 2:
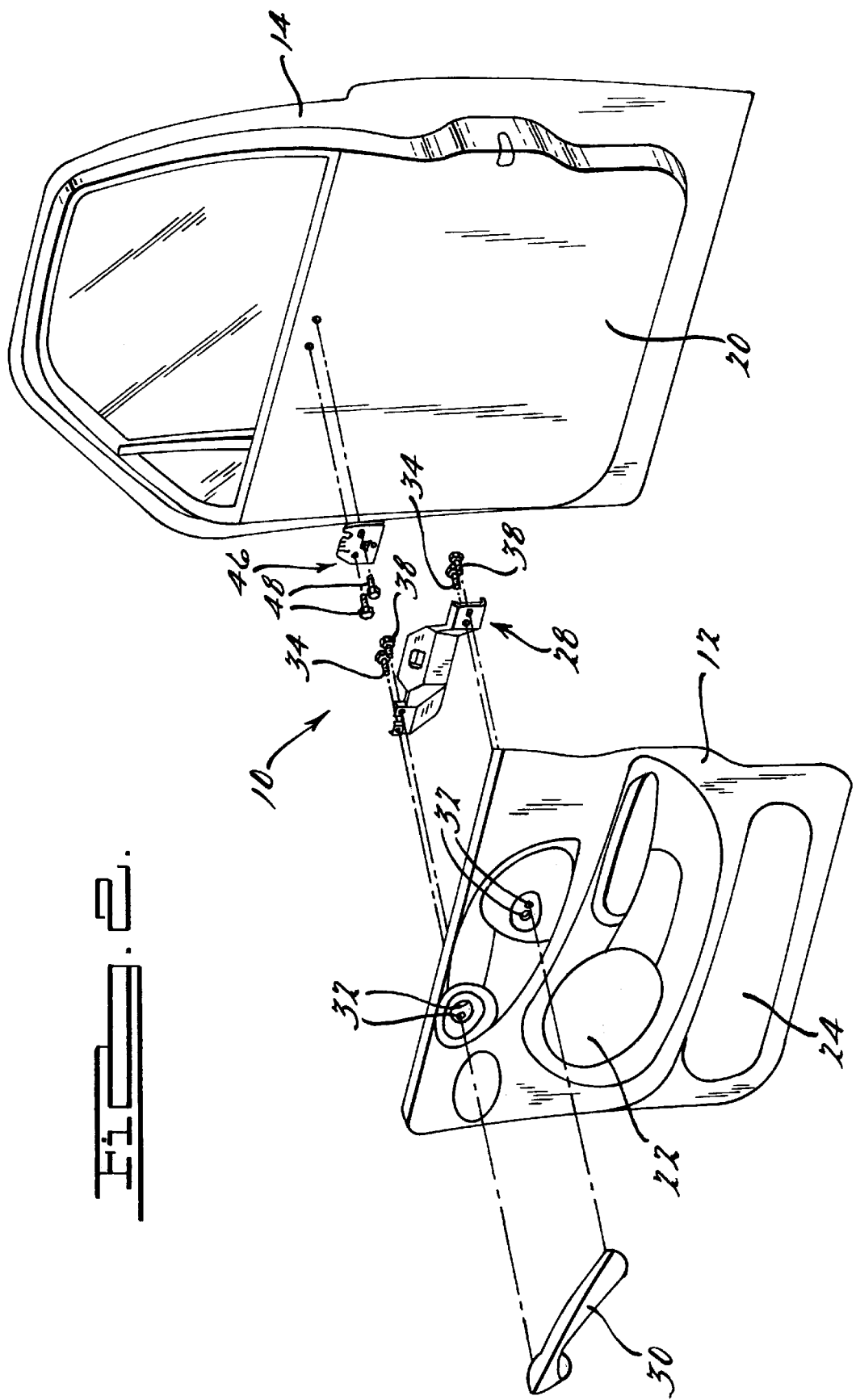
FIG. 2 is an exploded view of a trim panel mounting assembly, according to the present invention, for mounting the trim panel to the door of FIG. 1.

Referring now to the drawings and in particular FIG. 1 and 2, one embodiment of a trim panel mounting assembly 10, according to the present invention, is shown for a motor vehicle, generally indicated at 11. The trim panel mounting assembly 10 is adapted to mount a trim panel 12 to vehicle structure such as a door 14 of the motor vehicle 11. The trim panel mounting assembly 10 can be employed to mount any trim panel at a number of places on the motor vehicle 11, including the front or rear doors or any other place, to provide a load path to structural load bearing member of the motor vehicle. To that end, the specific trim panel shown in FIG. 1 and FIG. 2 is for purposes of illustration and not by way of limitation.

The motor vehicle 11 includes an occupant compartment which define an interior 18 of the motor vehicle 11. Trim components, such as the trim panel 12, help to define the interior 18 of the occupant compartment and are often referred to as class A surfaces. Class A surfaces must meet strict aesthetic requirements, including requirements which limit and even eliminate fasteners and plug buttons exposed to the interior 18 of the motor vehicle 11. Thus, in the environment depicted in the drawings, the trim panel 12 is mounted to an inner door panel 20. The inner door panel 20 is typically manufactured of sheet metal and forms a part of the load bearing structure of the door 14.

The trim panel 12 may also include non-load bearing sub-components such as a center arm rest and audio speaker panel 22 and a lower kick panel 24. These non-load bearing trim components can be mounted to the trim panel 12 using clips (not shown) or any other fastener suitable for the application.

Referring to FIGS. 2 and 3, the trim panel 12 also includes a trim panel bracket, generally indicated at 28, mounted on one side of the trim panel 12 opposite the interior 18. An interior door or pull handle 30 is mounted to the trim panel 12 through the trim panel bracket 28 on the opposite side of the trim panel 12 from the trim panel bracket 28 and facing the interior 18 of the motor vehicle 11. The interior door handle 30 is adaptable to be grasped by an occupant in the motor vehicle 11 to facilitate the opening and closing of the door 14. The interior door handle 30 includes a mounting structure (not shown) that extends through an aperture 32 provided in the trim panel 12 for that purpose. A threaded stud 34 is also received through an aperture 36 in the trim panel bracket 28 and retained in the mounting structure. It should be appreciated that such a mounting structure is disclosed in U.S. Pat. No. 5,529,370 to Veit, the disclosure of which is hereby incorporated by reference.

The interior door handle 30 further includes a boss (not shown) which is also molded at both ends of the interior door handle 30. The boss includes a blind hole or aperture which is adapted to receive a threaded machine screw 38 extending through aperture 40 of the trim panel bracket 28 as well as the trim panel 12 itself. The interior door handle 30 is thus firmly mounted to the trim panel bracket 28 via the trim panel 12 without any fastener exposed to the interior 18 of the motor vehicle 11.

Referring to FIGS. 2 and 4, the inner door panel 20 supports the trim panel 12 and includes an inner panel or support bracket, generally indicated at 46, mounted to the inner door panel 20. The support bracket 46 includes at least one, preferably a pair of apertures 47 which receive fasteners 48 to secure the support bracket 46 to the inner door panel 20. The support bracket 46 is located opposite the trim panel bracket 28 as illustrated in FIG. 2.

Referring to FIGS. 3 through 6, the trim panel bracket 28 includes a body portion 50 and a leg portion 52 extending from the body portion 50. The leg portion 52 is spaced from the body portion 50 by a connecting portion 54 having a generally inverted U-shape. The body portion 50 may include an aperture or clearance slot 56 extending therethrough opposite the leg portion 52 for a function to be described. The body portion 50, leg portion 52 and connecting portion 54 are integral, unitary and formed as one-piece from a rigid material such as metal.

The support bracket 46 includes a body portion 57 and a clip 58 extending from the body portion 57. The support bracket 46 also includes a tab 60 extending from the clip 58. The clip 58 extends transversely and is supported by a space or slot 59 on each side to be disposed forwardly of the body portion 57 and to allow deflection thereof. The body portion 57, clip 58 and tab 60 are integral, unitary and formed as one-piece from a rigid material such as metal.

Referring to FIG. 5 illustrating pre-installation of the trim panel mounting assembly 10, the trim panel bracket 28 is mounted to the trim panel 12 and the support bracket 46 is mounted to the inner door panel 20. The installer disposes the leg portion 52 between the clip 58 and the body portion 57. The tab 60 acts as an incline to interfere with the leg portion 52 on the trim panel bracket 28 when the leg portion 52 is not properly aligned with the clip 58 on the support bracket 46. This prevents assembly of the trim panel 12 to the inner door panel 20 and indicates to the installer that the brackets 28, 46 are not correctly aligned. Due to the inclined angle, the tab 60 acts as a ramp to guide the leg portion 52 of the trim panel bracket 28 into the clip 58 of the support bracket 46. The clip 58 is deflected slightly and returns to secure the leg portion between the clip 58 and body portion 57 as illustrated in its final installation in FIG. 6. It should be appreciated that the clearance slot 56 allows the tab 60 of the support bracket 46 to pass through the plane of the trim panel bracket 28 without interference.

Thus, the trim panel mounting assembly 10 uses only one clip/leg 58, 52 and incorporates a tab 60 56 that guides the brackets 28, 46 to the correct position during installation. This single combination of features improves assembly since it requires the installer to execute only one engagement and it is easier to verify that engagement of the brackets 28, 46 has indeed taken place in the assembly. The trim panel mounting assembly 10 eliminates the requirement that the installer precisely align the brackets 28, 46 during assembly and is better suited to the inherent assembly variation which exists in a mass production environment. The trim panel mounting assembly 10, through the cooperation of the interlocking trim panel 12 and support brackets 28, 46, provides a direct load path from the interior door handle 30 to the inner door panel 20 via the door trim panel 12. In this way, the trim panel mounting assembly 10 allows the trim panel 12 to sustain substantial loads at the interior door handle 30 on the trim panel 12 without any additional exposed fastener or plug buttons.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A trim panel mounting assembly for a motor vehicle comprising:

a trim panel bracket mounted to one side of a trim panel opposite an interior of the motor vehicle and a support bracket mounted to an inner door panel opposite said trim panel bracket;

means for allowing said trim panel bracket and said support bracket to self-align when said trim panel bracket and said support bracket are brought into proximate position for installation;

wherein said means comprises a leg portion on said trim panel bracket and a clip on said support bracket such that said leg portion of said trim panel bracket is received in said clip of said support bracket to provide a direct load path for the trim panel to the inner door panel of the motor vehicle;

wherein said trim panel bracket includes a body portion and a connecting portion extending between said leg portion and said body portion to form a space therebetween; and wherein said connecting portion has an inverted U-shape.

2. A trim panel mounting assembly for a motor vehicle comprising:

a trim panel bracket mounted to one side of a trim panel opposite an interior of the motor vehicle and a support bracket mounted to an inner door panel opposite said trim panel bracket;

means for allowing said trim panel bracket and said support bracket to self-align when said trim panel bracket and said support bracket are brought into proximate position for installation;

wherein said means comprises a leg portion on said trim panel bracket and a clip on said support bracket such that said leg portion of said trim panel bracket is received in said clip of said support bracket to provide a direct load path for the trim panel to the inner door panel of the motor vehicle;

wherein said trim panel bracket has a body portion and said support bracket has a body portion;

wherein said means includes a tab extending outwardly at an incline from said clip to guide said leg portion in the space between said clip and said body portion of said support bracket; and wherein said body portion of said trim panel bracket includes a slot to receive said tab when said leg portion is disposed in the space between said clip and said body portion of said support bracket.

3. A trim panel mounting assembly as set forth in claim 2 wherein said body portion, said clip and said tab of said support bracket are integral, unitary and formed as one-piece.

4. A trim panel mounting assembly for a motor vehicle comprising:

a trim panel bracket mounted to one side of a trim panel opposite an interior of the motor vehicle and a support bracket mounted to an inner door panel opposite said trim panel bracket;

a leg portion on said trim panel bracket and a clip on said support bracket for guiding said trim panel bracket and said support bracket to an aligned condition when said trim panel bracket and said support bracket are brought into proximate position for installation such that said leg portion of said trim panel bracket is received in said clip of said support bracket to provide a direct load path for the trim panel to the inner door panel of the motor vehicle;

a tab extending outwardly at an incline from said clip to interfere with said leg portion on said trim panel bracket when said leg portion is not properly aligned with said clip on said support bracket and to indicate to an installer a misaligned condition between said the trim panel bracket and said support bracket during installation; and wherein said trim panel bracket includes a slot to receive said tab when said leg portion is disposed in a space between said clip and said support bracket.

5. A trim panel mounting assembly as set forth in claim 4 wherein said trim panel bracket includes a body portion and a connecting portion extending between said leg portion and said body portion to form a space therebetween.

6. A trim panel mounting assembly for a motor vehicle comprising:

a trim panel bracket mounted to one side of a trim panel opposite an interior of the motor vehicle and a support bracket mounted to an inner door panel opposite said trim panel bracket;

a leg portion on said trim panel bracket and a clip on said support bracket for allowing said trim panel bracket and said support bracket to self-align when said trim panel bracket and said support bracket are brought into proximate position for installation such that said leg portion of said trim panel bracket is received in said clip of said support bracket to provide a direct load path for the trim panel to the inner door panel of the motor vehicle;

wherein said trim panel bracket includes a body portion and a connecting portion extending between said leg portion and said body portion to form a space therebetween; and wherein said connecting portion has an inverted U-shape.

7. A trim panel mounting assembly as set forth in claim 5 wherein said body portion, said connecting portion and said leg portion of said trim panel bracket are integral, unitary and formed as one-piece.

8. A trim panel mounting assembly as set forth in claim 4 wherein said support bracket includes a body portion, said clip extending from said body portion to form a space therebetween to receive said leg portion on said trim panel bracket.

9. A trim panel mounting assembly for a motor vehicle comprising:

a trim panel bracket mounted to one side of a trim panel opposite an interior of the motor vehicle and a support bracket mounted to an inner door panel opposite said trim panel bracket;

a leg portion on said trim panel bracket and a clip on said support bracket for allowing said trim panel bracket and said support bracket to self-align when said trim panel bracket and said support bracket are brought into proximate position for installation such that said leg portion of said trim panel bracket is received in said clip of said support bracket to provide a direct load path for the trim panel to the inner door panel of the motor vehicle;

wherein said support bracket includes a body portion, said clip extending from said body portion to form a space therebetween to receive said leg portion on said trim panel bracket;

a tab extending outwardly at an incline from said clip to guide said leg portion in the space between said clip and said body portion of said support bracket; and wherein said trim panel bracket includes a body portion having a slot to receive said tab when said leg portion is disposed in the space between said clip and said body portion of said support bracket.

10. A trim panel mounting assembly as set forth in claim 8 wherein said body portion, said clip and said tab of said support bracket are integral, unitary and formed as one-piece.

11. A trim panel mounting assembly for a motor vehicle comprising:

a trim panel bracket mounted to one side of a trim panel opposite an interior of the motor vehicle and a support bracket mounted to an inner door panel opposite said trim panel bracket;

a leg portion on said trim panel bracket and a clip on said support bracket such that said leg portion of said trim panel bracket is received in said clip of said support bracket to provide a direct load path for the trim panel to the inner door panel of the motor vehicle;

said trim panel bracket including a body portion and an inverted U-shape connecting portion extending between said leg portion and said body portion to form a space therebetween;

said support bracket including a body portion, said clip extending from said body portion to form a space therebetween to receive said leg portion on said trim panel bracket;

said clip of said support bracket including a tab extending outwardly at an incline from said clip to guide said leg portion in the space between said clip and said body portion; and said body portion of said trim panel bracket including a slot to receive said tab when said leg portion is disposed in the space between said clip and said body portion of said support bracket.

12. A trim panel mounting assembly as set forth in claim 11 wherein said body portion, said connecting portion and said leg portion of said trim panel bracket are integral, unitary and formed as one-piece.

13. A trim panel mounting assembly as set forth in claim 11 wherein said body portion, said clip and said tab of said support bracket are integral, unitary and formed as one-piece.

* * * * *